Nov. 8, 1938.  L. R. RHEIN ET AL  2,135,625
HOOD LATCH
Filed Feb. 20, 1937  2 Sheets-Sheet 1

Inventors
Lloyd R. Rhein &
Floyd A. Cooley
By Blackmore, Seneca & Flint
Attorneys Patented Nov. 8, 1938

2,135,625

UNITED STATES PATENT OFFICE 2,135,625

HOOD LATCH

Lloyd R. Rhein, Pleasant Ridge, and Floyd A. Cooley, Detroit, Mich., assignors to Ternstedt Manufacturing Company, Detroit, Mich., a corporation of Michigan Application February 20, 1937, Serial No. 126,774

4 Claims. (Cl. 292—215)

This invention relates to latches and has particular reference to a latch to hold down the movable section of the hood of an automotive vehicle.

The invention relates to the type of hood in which there is a fixed side panel and a movable top only. The specific novelty of the invention relates to the application of the operating rod to the rigid panel and the brackets to the movable section of the hood. A further novel feature of the invention resides in the forming of a crank at the middle of the operating rod and the mechanism for operating the crank.

On the drawings

Figure 1 is a side view of a part of an automotive vehicle showing the application of the invention and showing in dotted outline the raisable section of the hood in raised position.

Figures 2 and 3 are enlarged sectional detailed views on the lines 2—2 and 3—3 of Figure 1, the dotted line positions indicating the parts at the other extreme of their movement.

Figure 1:
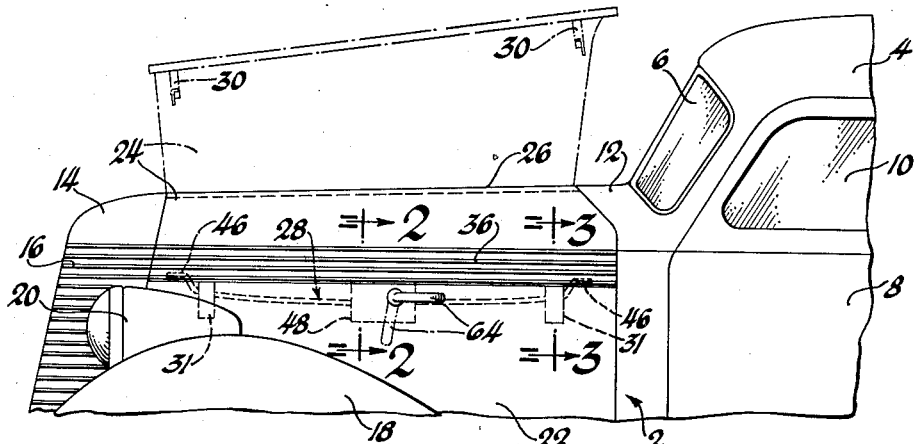

Referring to the drawings, the numeral 2 indicates an automotive vehicle as a whole. The vehicle has the usual metal top 4, the divided windshield 6, the front door 8 (having the usual window 10), the cowl 12, radiator shell 14, radiator grille 16, front fenders 18, and headlamps 20. These parts are conventional, and per se form no part of the invention.

The hood of the vehicle has the fixed side panel 22 and the hinged top 24. The hinged part 24 of the hood is hinged along the center line 26 of the hood. The novel latch of the invention is indicated as a whole at 28, the ends of the latch being adapted to engage with keepers 30 in the movable section 24 of the hood.

Figures 2, 3:
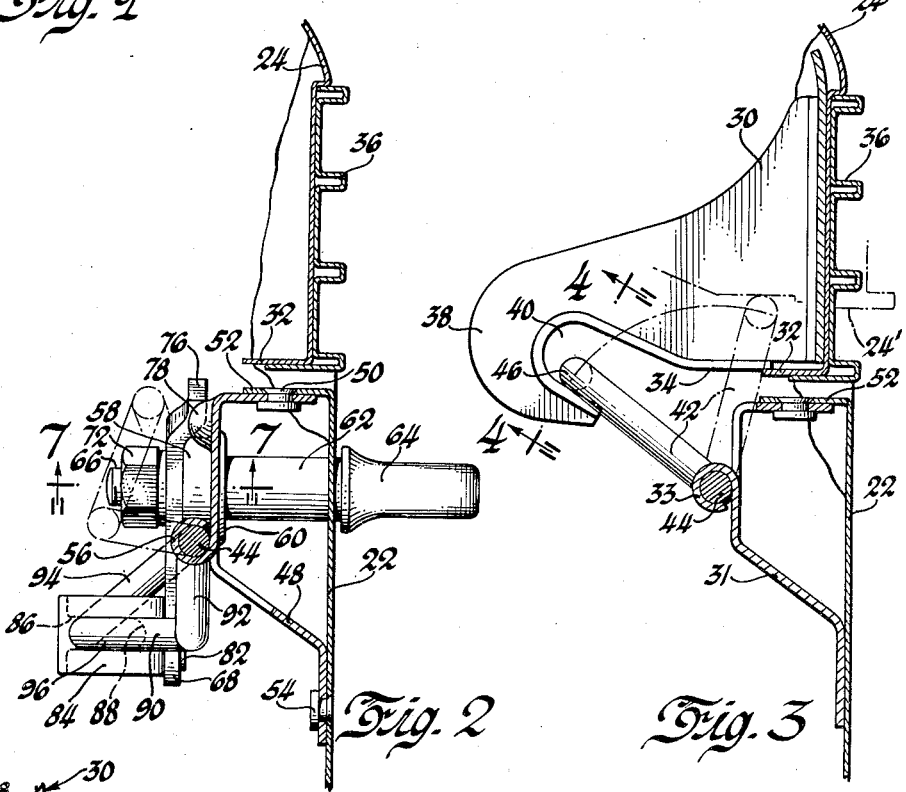
Figure 4:
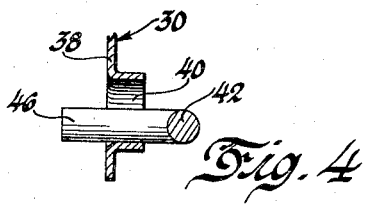
Figure 4 is a sectional detailed view on the line 4—4 of Figure 3.

Referring to the detail of Figure 3, the brackets 30 are secured to the inside hinged section 24 at its lowermost edge, the brackets being secured in any suitable way such as by welding, riveting, or bolting. The hood section has the lower inturned flange 32 on which the lower edge 34 of the bracket rests. Immediately outside the lower edge of the section 24 the decorative panel 36 is secured. The keepers 30 have the hooked ends 38 forming the recess 40 in which the bent ends 42 of the rod 44 are received. The bent ends 42 include the tip part 46 (Figures 1 and 4) which is adapted to engage directly in the recess 40. Upon the operation of the rod the tip 46 will swing from the full line position in Figure 2 to the dotted line position to cause the tip 46 to engage under the edge 34 to raise the hood slightly to the dotted line position indicated at 24'.

Referring to Figure 3, at each end of the fixed section 22 a bracket 31 is secured by riveting or welding, these brackets being bent away from the panel 22 as shown. Each bracket 31 has an ear 33 pressed therefrom and formed into an eye to form a journal or bearing for the rod 44.

Figure 6:
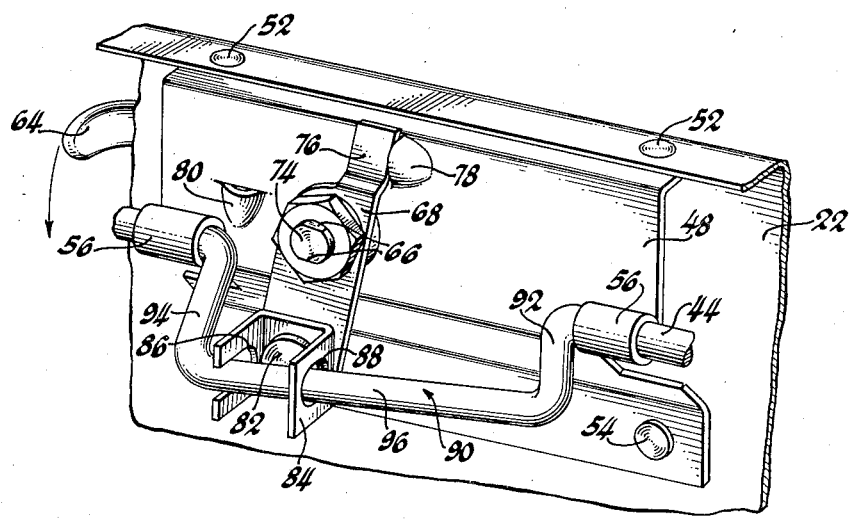
Figure 7:
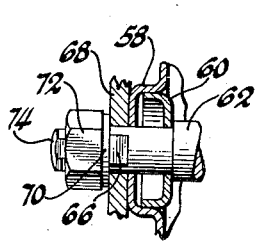
Figure 7 is a sectional detail on the line 7—7 of Figure 2.

Referring to Figure 2, the rigid or fixed part 22 of the hood has secured substantially at its middle a bracket 48. The bracket is of the cross sectional configuration shown in Figure 2 and is secured at its top by means of the rivet 50 to an inturned flange 52 at the top edge of the section 22 and at its bottom is fastened by means of welding or by the rivets 54 to the side of the hood. The bracket 48 has the tongues 56 pressed therefrom and formed into eyes to form journals or bearings for the rod 44 of the latch (see Figures 5 and 6). The bearings 33 and 56 are in alignment. The bracket has the protuberance 58 (see Figure 7) pressed therein and a flanged washer 60 is positioned in the protuberance 58 and with the protuberance 58 and the panel 22 forms a bearing for the operating shaft 62 of the latch mechanism. The panel 22, washer 60, and protuberance 58 have aligned openings to receive the shaft 62. A handle 64 on the outside of the hood is connected to the shaft 62 to operate it. On the inside of the shaft 62 flats 66 are provided and over the flats there is positioned and held thereby the operating arm or lever 68. The shaft 62 is held in its bearings and the arm 68 on the flats 66 of the shaft by means of the washer 70 and the nut 72 screw threaded in the threaded end 74 of the shaft 62.

The arm 68 has a finger 76 projecting from one end thereof, the finger 76 being adapted to engage with the stops 78 and 80 to limit the arc of movement of the arm 68.

The free end of the arm 68 has pivoted thereto by means of the rivet 82 the U-shaped clip 84. One arm of the clip has a recess 86 and the other arm has an elongated opening or slot 88 the purpose of which will later be described.

At substantially its middle part and intermediate the journals 56 the rod 44 is provided with a crank 90. The crank has a short throw 92 and a long throw 94, the throws 92 and 94 being bent at substantially right angles to the rod 44 but the plane of the throw 92 and the rod 44 on the one hand is not coincident with the plane of the throw 94 and rod 44 on the other hand. In other words, the planes of the throws 92 and 94 are angularly related to non-coplanar. The ends of the throws 92 and 94 are connected by the bearing part 96 which is received in the recess 86 and opening 88 of the clip 84.

Figure 5:
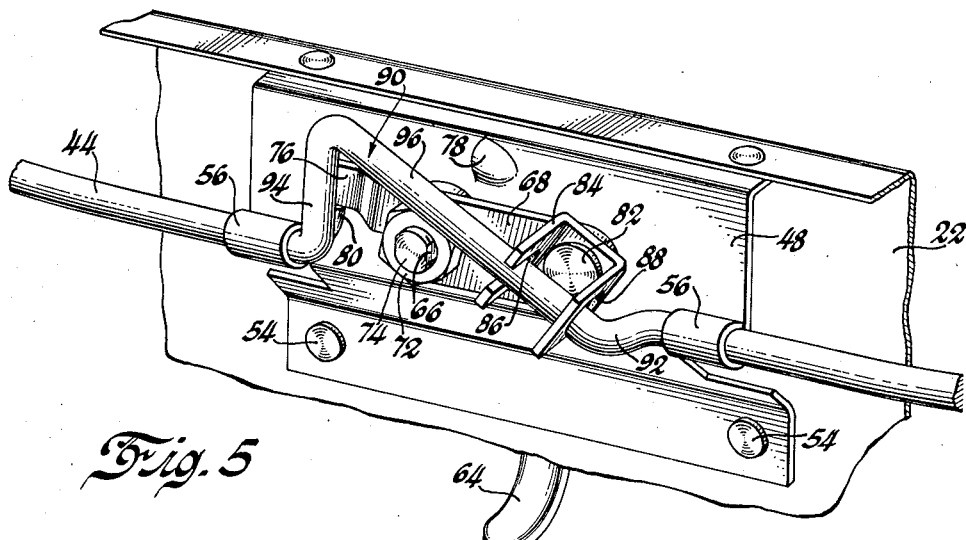
Figures 5 and 6 are detailed views looking from the inside of the vehicle showing the crank arm and its operative parts in the two extreme positions of the mechanism.

The operation of the device is as follows: By referring to Figure 5, the unlatched position of the parts is shown. With the crank 90 in the position shown in Figure 5, the ends 42, 46 of the rod 44 will be in the dotted line position shown in Figure 3. The operating arm 68 in the position shown in Figure 5 is a little over center to make certain that the parts are held rigidly in unlatched position so that the parts may be so retained while the hood is being raised. When the hood is lowered to the position shown in Figures 2 and 3, the operator seizes the handle 64 and turns it to the position shown in Figure 6, or through an arc of substantially 90°. The lever 64 will swing the arm 68 from its slightly over center position through the arc determined by the stops 80 and 78 and will swing the crank arm from the position in Figure 5 to that of Figure 6. As the arm 68 moves from the extreme position of Figure 5 to the extreme position of Figure 6, the U-shaped clip 84 will move along the bearing part or connector 96 of the crank from the short throw 92 to the long throw 94 and cause a turning of the crank 90 and necessarily a turning of the rod 44 to swing the ends 46 of the rod from the dotted line position in Figure 3 to the full line position to cause the tips 46 to engage in the recesses 40 of the keepers 30, rigidly to hold the hood in lowered position. In the position shown in Figure 6, the arm 68 is a little over center to prevent accidental return of the parts and to insure that the hood will be retained in latched position.

We claim:

1. In a hood latch for the hoods of automotive vehicles, a rod journaled to the vehicle intermediate its ends and having terminal hooks adapted to engage with keepers secured to the hood, a crank intermediate the ends of said rod, said crank comprising throws bent at substantially right angles to the rod, the plane passing through one throw and the rod forming an angle of about 45° with the plane passing through the other throw and the rod, one of said throws being shorter than the other, said throws being interconnected by a bearing part, and an arm journaled on the vehicle and connected to the crank and adapted to turn the crank to release the hooks from or engage them with the keepers.

2. In a hood latch for the hoods of automotive vehicles, a rod extending the length of the hood and being journaled intermediate its length to the vehicle and having its ends adapted to engage with keepers on the hood, said rod having a crank intermediate its ends and immediately adjacent two of the journals of the rod, said crank comprising throws bent at an angle to the rod, said throws being in different planes, a bearing part interconnecting said throws, and means journaled to the vehicle and connected with the throw to operate the throw to cause the movement of the rod to cause the rod to engage or disengage its ends with the keepers.

3. In a hood latch for the hoods of automotive vehicles, a rod extending the length of the hood and being journaled intermediate its ends to the vehicle and having its ends adapted to engage with keepers on the hood, a crank on the rod intermediate its ends, said crank having one throw longer than the other, said throws being in angularly related planes and being interconnected by a bearing member positioned in a plane angularly related to the planes including the rod and one throw, and means to operate the crank to cause the turning of the rod to cause the rod ends to become engaged with or disengaged from the keepers.

4. In a hood latch for the hoods of automotive vehicles, a means for operating a latching rod extending the length of the hood and being journaled intermediate its ends to the vehicle and having its ends adapted to be engaged with keepers on the hood, said means comprising a crank arm on the rod intermediate its ends, said crank having throws of unequal length, an operating arm journaled on the vehicle, and a U-shaped clip on the end of said arm and engaging said crank, one leg of said U clip having a recess and the other leg an opening in which to receive the crank, the operation of said arm causing the clip to turn the crank to cause the rod ends to become engaged with or disengaged from their keepers.

LLOYD R. RHEIN.
FLOYD A. COOLEY.